Figure 1:
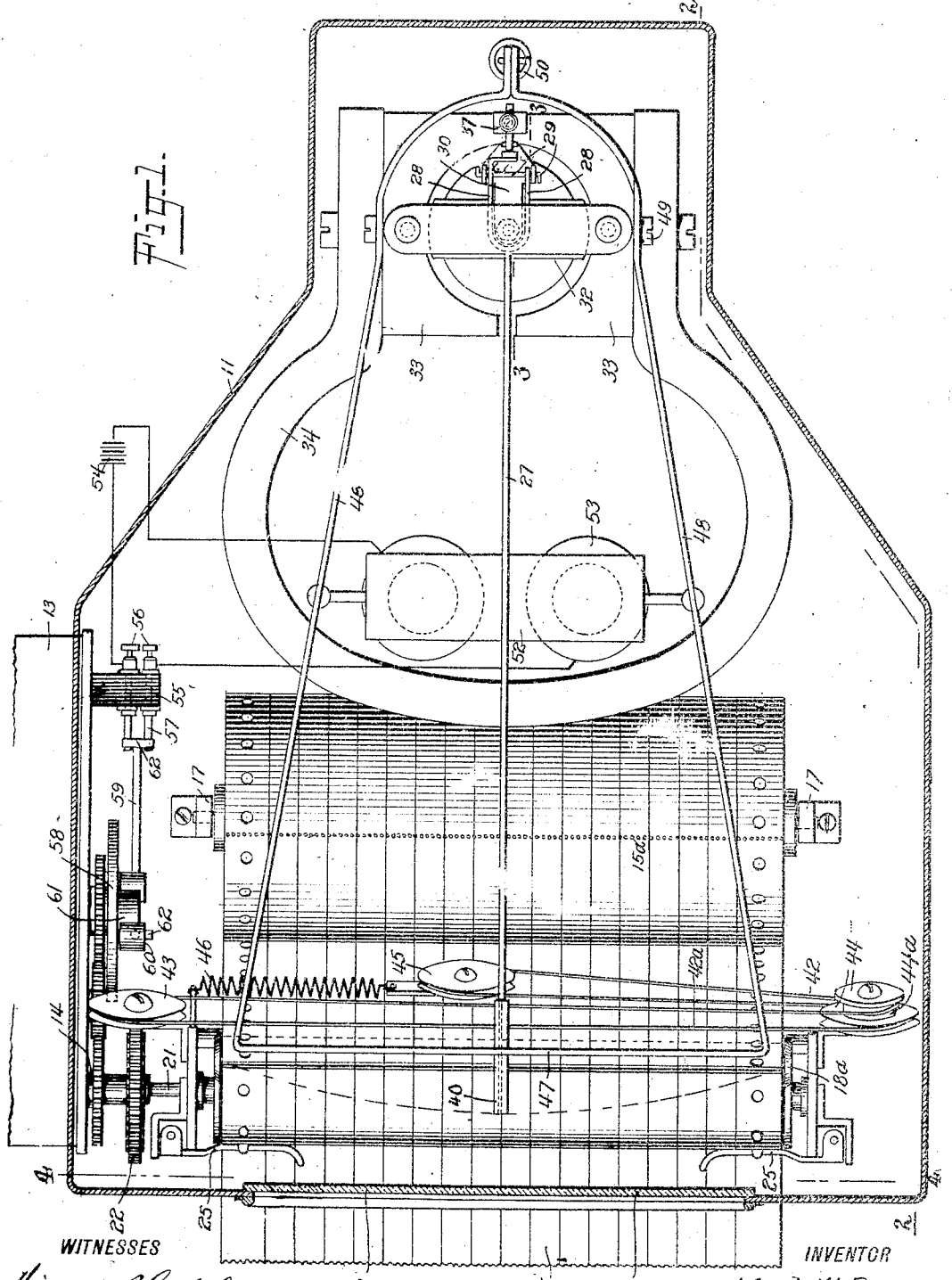

H. W. PAYNE.
RECORDING MECHANISM.
APPLICATION FILED APR. 24, 1913.

1,090,749.

Patented Mar. 17, 1914.

3 SHEETS—SHEET 1.

WITNESSES
William P. Goebel
Geo. L. Beeler

INVENTOR
Hugh W. Payne
BY
ATTORNEYS

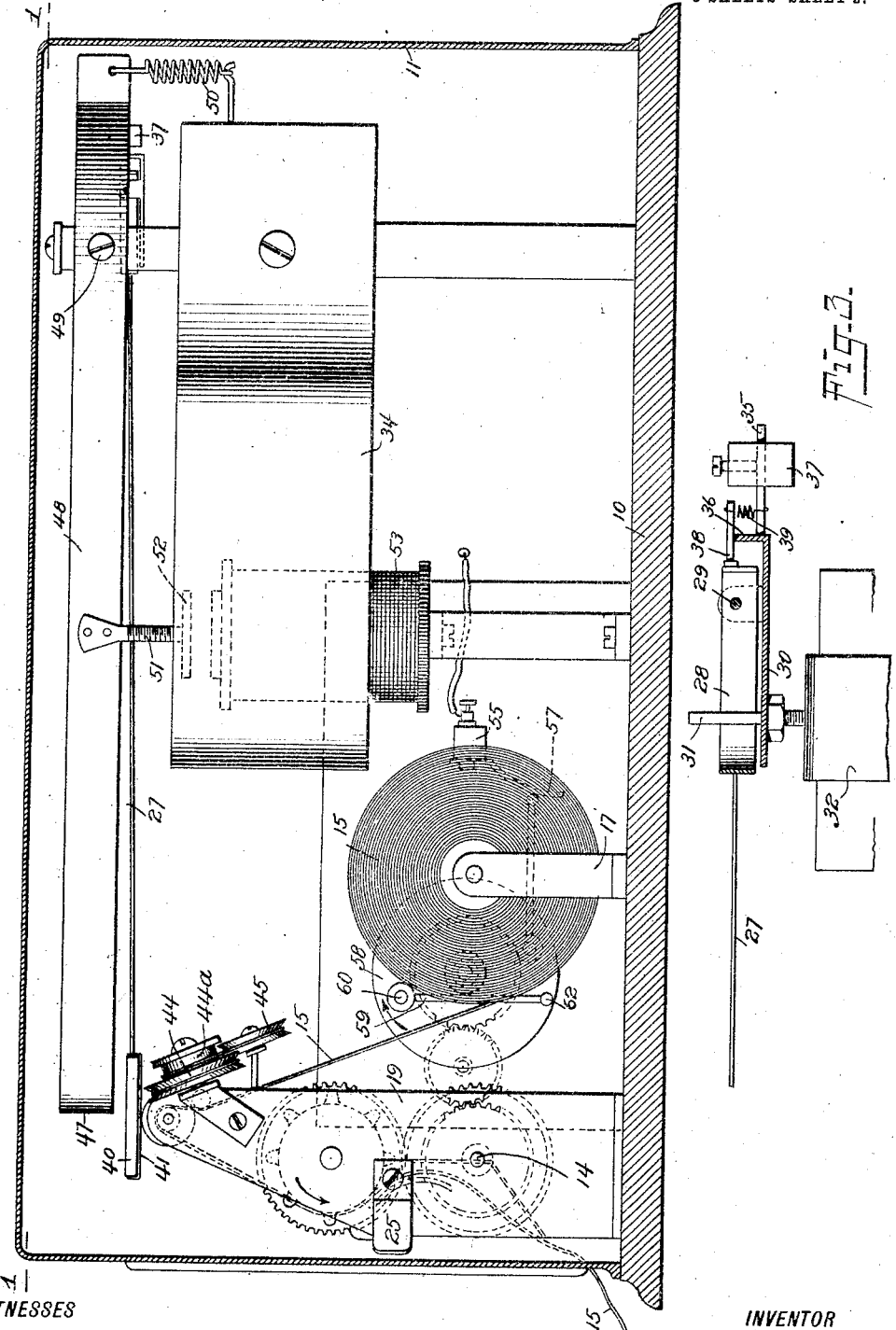

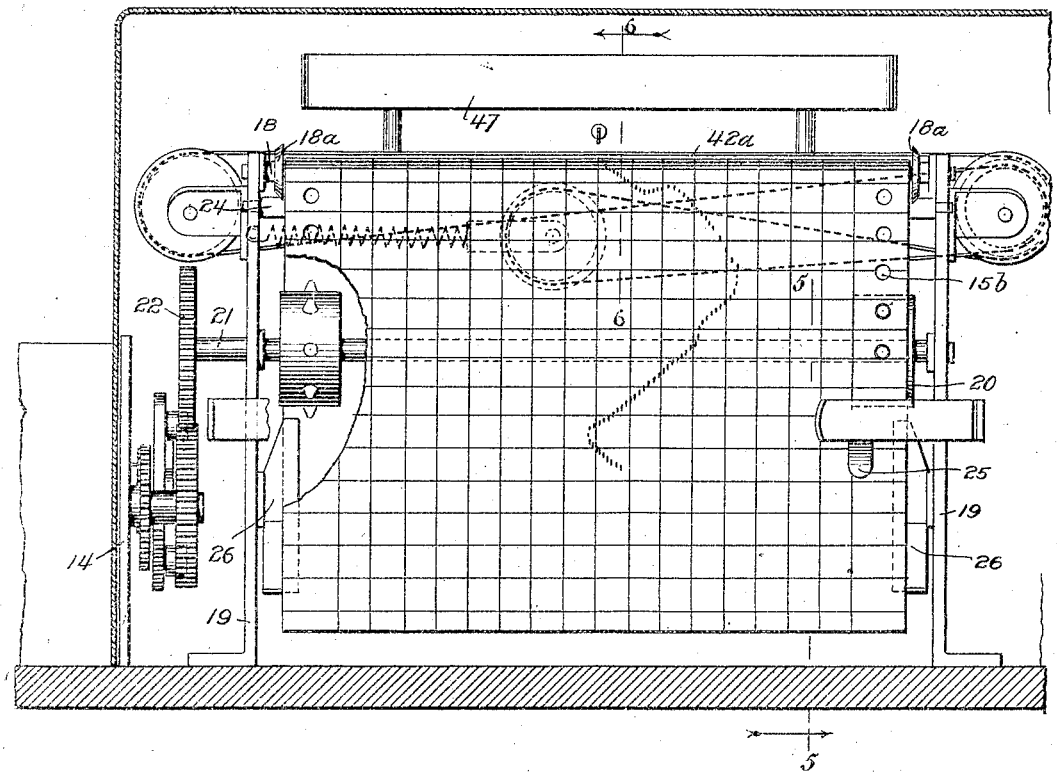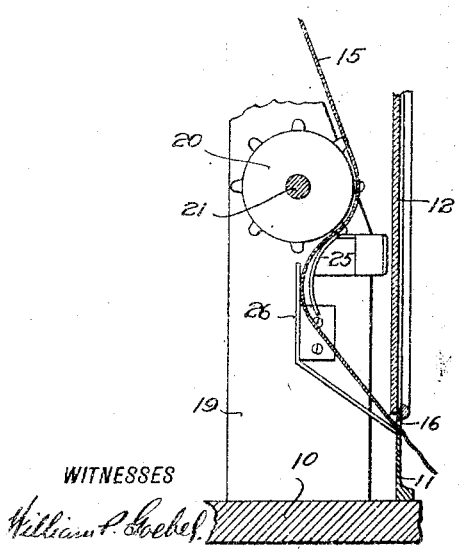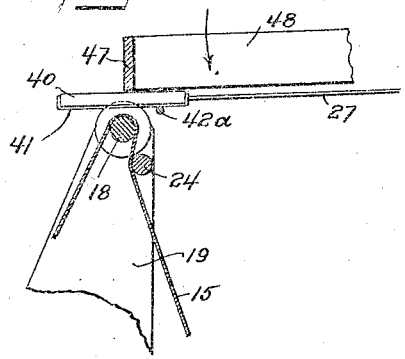

UNITED STATES PATENT OFFICE.

HUGH WILFRED PAYNE, OF ROCHESTER, NEW YORK.

RECORDING MECHANISM.

1,090,749.

Specification of Letters Patent. Patented Mar. 17, 1914.

Application filed April 24, 1913. Serial No. 763,395.

*To all whom it may concern:*

Be it known that I, HUGH W. PAYNE, a subject of the King of Great Britain, and a resident of Rochester, in the county of Monroe and State of New York, have invented a new and Improved Recording Mechanism, of which the following is a full, clear, and exact description.

This invention relates to recording mechanism designed especially for recording delicate and accurate measurements or quantities such as volts.

Among the objects of the invention is to improve this class of devices whereby the operation thereof with respect to the galvanometer is practically frictionless and hence more delicately accurate than the devices usually employed for this purpose.

A further object of the invention is to arrange and construct an instrument of the character set forth which is adapted for making variable records upon a chart having rectangular coördinates whereby such records are more easily and reliably read than when made on other forms of charts.

A still further object of the invention is to improve this class of devices along general lines whereby the same are rendered not only more rapid in operation, with respect to the rapidity in which the presser bar releases the boom, and easier of interpretation, but are more satisfactory in other ways.

The foregoing and other objects of the invention will hereinafter be more fully described and claimed and illustrated in the drawings forming a part of this specification in which like characters of reference indicate corresponding parts in all the views, and in which—

Figure 1 is a plan view of the mechanism, the view being taken through the casing on the line 1—1 of Fig. 2; Fig. 2 is a vertical section on the line 2—2 of Fig. 1 through the casing and indicating the mechanism in elevation; Fig. 3 is a vertical longitudinal detail substantially on the line 3—3 of Fig. 1; Fig. 4 is a front elevation within the casing on the line 4—4 of Fig. 1; Fig. 5 is a vertical sectional detail on the line 5—5 of Fig. 4, looking toward the right; and Fig. 6 is a similar view on the line 6—6, looking in the opposite direction.

The several parts of the device may be made of any suitable materials, and the relative sizes and proportions thereof, as well as the general design of the mechanism, may be varied to a considerable extent without departing from the spirit of the invention hereinafter more fully set forth and specifically claimed. By way of illustration, therefore, of a preferred embodiment of this invention and without wishing to be limited unnecessarily to the mechanism shown, I provide a base 10 having arranged thereon a casing 11 provided in its front with a socket 12. Associated with said casing is any suitable form of time controlled mechanism or clock 13. The clock mechanism may be of any suitable nature, but the same being understood to include a shaft 14 from which certain parts hereinafter referred to may be operated.

At 15 is shown a spool or roll of paper or the like upon which the record is to be made. Said paper will be hereinafter referred to as the chart, and as illustrated, is preferably provided with rectangularly arranged lines and arranged in sheets connected by perforated or weakened lines $15^a$. Each of the sheets will preferably be long enough to receive the record for twenty-four hours, and hence may be readily detached from the remainder of the chart when delivered through an opening 16 at the front of the casing. Said roller is shown mounted upon a pair of standards 17 extending upwardly from the base. The chart extends thence forwardly and upwardly over an anvil roller 18 journaled transversely of the device at the upper ends of a pair of supports 19 likewise secured to the base 10. The chart is preferably provided along its edges with perforations $15^b$ for coöperation with the teeth of rollers or sprocket wheels 20 connected to a shaft 21. Said shaft is journaled in the supports 19 and is provided at one end with a gear wheel 22 driven through the other gears 23 from the shaft 14 whereby the chart will be advanced slowly in accordance with the operation of the clock. The anvil roller 18 is of relatively small diameter for a reason to appear later, and to secure proper tension on the chart adjacent thereto I provide an auxiliary or tension roller 24 just in the rear of and below the roller 18. Said roller 24 is journaled likewise in the supports 19. The anvil roller is also provided at its ends with flanges $18^a$ for the purpose of keeping the chart in precise longitudinal position.

At 25 I show a pair of guides in front of the chart to maintain proper engagement with the sprocket wheels 20, and at 26 are other guides in the rear of the chart serving to deliver the chart from the teeth of the sprocket wheels at the proper time and cause it to be projected through the opening 16.

At 27 I show a suitable form of needle mechanism, the same being illustrated as a galvanometer needle or boom, the free end of which extends forwardly over the anvil roller 18, but normally is spaced therefrom as shown in Fig. 2. The boom 27 is provided with a yoke 28 journaled on a transverse pivot 29 at the rear end of a bracket 30. Said bracket is secured to the vertical stem 31 of the coil or armature 32 of the galvanometer, and hence subject to the variations resulting from the variations in the line of force between the pole pieces of the field 34. Said bracket 30 has a rearwardly extending stem 35 and an upwardly projecting stop 36. A counterbalance 37 is adjustably secured to the stem 35, and a projection 38 at the rear end of the yoke 28 is adapted to impinge against the stop 36 and limit the upward movement of the free end of the boom under the influence of a spring 39 connected to the projection 38 and the stem 35. The projection 38, therefore, normally impinges the stop 36. The said free end of the boom consists of a head 40 to which is connected a marking device 41. This device consists preferably of a silk thread extending along the bottom of the head 40 lengthwise thereof and connected at its ends in any suitable manner.

At the rear of the anvil roller 18 is provided an ink supplying mechanism, the same comprising a cord 42 supported upon and extending over a series of pulleys 43, 44 and 45. The last mentioned pulley serves to keep the cord under tension by virtue of a spring 46. One run of the cord extending between the upper edges of the pulleys 43 and 44 and indicated at 42ª lies parallel to and just above the plane of the upper edge of the anvil roller 18 and chart extending thereover, as shown in Figs. 4 and 6. The length of the head 40 is sufficient to always span the cord 42ª and the anvil roller irrespective of the lateral oscillations of the boom, as indicated by the dotted curved line on Fig. 1.

Any suitable mechanism may be used to cause the head of the galvanometer boom to be depressed periodically from the aforesaid clock mechanism. For this purpose I show a presser bar 47 extending parallel to and preferably directly above the axis of the anvil roller 18, and normally spaced from said head as shown in Fig. 2. The presser bar is normally carried by a pair of arms 48 pivoted at 49 adjacent the galvanometer and having their rear ends under the influence of a spring 50 which tends to maintain said presser bar in said normal position. The arms 48 are connected at 51 with an armature 52 of an electromagnet 53 in circuit with a battery 54. At 55 I show a block of insulation which serves as a support for a pair of binding posts 56 and to which posts are connected a pair of contact springs 57 normally spaced from each other. A wheel 58 operating in a vertical plane from said clock mechanism carries one or more swinging arms 59 pivoted adjacent the periphery of the wheel at points 60. The wheel 58 also carries on its face preferably concentrically therewith a hub 61. The arms 59 are normally pendent from their pivots 60 and hence are carried upwardly, as shown in Fig. 2, but when the wheel 58 rotates sufficiently the hub 61 causes the arms 59 to swing rearwardly on their pivots in succession, causing the contact springs 57 to be bridged temporarily by fingers 62. At this moment, therefore, the circuit through the magnet will be completed, and the armature 52 being attracted by the coils of the armature will cause a downward impulse of the presser bar. The presser bar strikes the top of the head 40 causing it first to come into contact with the cord 42ª, and hence receive therefrom a small portion of ink and on the continued downward movement of the head the thread 41 will strike the upper edge of the chart, leaving an impression thereon in the nature of a dot due to the small diameter of the anvil roller and the comparatively short time of contact. The thread 41 is, therefore, kept inked from the supply cord 42 and the ink is conveyed by capillarity throughout the length of the thread 41 so that a dot impression will always be made by the head under the influence of the presser bar at any point along the top or upper surface of the anvil roller. This impression is always made in a straight line, namely, the line determined by the extreme upper edge of the anvil roller, and this is true irrespective of the swing of the head 40 through an arc of a circle. It will be observed also that the thread 41 may receive or deliver ink at various points along its length.

Ink may be supplied to the cord 42 in any suitable manner, and for this purpose I provide an ink pad 44ª in connection with one or the other of the parts of the pulley 44. Such ink will be carried along the cord by capillarity so as to supply the thread 41. It will be noted, also, in this connection that my improved manner of supplying ink to the head 40 and the transfer of the same to the record is such that there is always an equal exchange of ink; that is to say, every time the head delivers a modicum of ink to the record, a corresponding amount of ink is taken up thereby from the cord 42ª. By this means I am able to provide and maintain a more delicate poise for the galvanometer mechanism.

Having thus described my invention, I claim as new and desire to secure by Letters Patent:—

1. In a recording mechanism, the combination of a horizontal roller, a chart having rectangular coördinates thereon, means to cause movement of the chart over the roller, impression mechanism operating above the roller and shiftable in a plane parallel to and normally spaced therefrom, said impression mechanism including a head extending transversely of the roller and having secured thereto a capillary member, ink supplying mechanism including a cord stretched parallel to the roller and above the upper edge thereof, and means to cause depression of said head whereby the capillary member thereof will first receive a supply of ink from the cord and secondly deliver ink to the chart in contact with the roller.

2. The combination with a galvanometer including a boom mounted on a horizontal pivot and shiftable in a horizontal plane, of an anvil roller, a chart, means to cause the chart to move over the roller, said galvanometer boom having a head spanning the roller throughout the shifting of the boom and normally spaced therefrom, ink supplying means adjacent the roller and normally spaced therefrom and from said head, and means to cause the head to be periodically depressed into coöperation with said ink supplying means and to cause an impression to be made on the chart passing over the roller, the ink supplying means delivering a modicum of ink to the head equal to that delivered by the head to the chart.

3. The combination with a galvanometer including a boom, the free end of the boom having a longitudinal head provided with a capillary member along its lower surface, of an anvil roller below said head and normally spaced therefrom, means to supply ink periodically to said capillary member, a presser bar extending parallel to the roller and above the axis thereof and normally spaced from the boom head, said head being normally free from both the presser bar and said roller, and time controlled means to periodically cause the presser bar to impinge upon said head to produce a dot impression upon the chart passing over the roller and also to cause the head to receive a modicum of ink from said ink supplying means equal to that forming the dot.

In testimony whereof I have signed my name to this specification in the presence of two subscribing witnesses.

HUGH WILFRED PAYNE.

Witnesses:
 WM. O. TERRY,
 HENRY L. MEYER.